United States Patent

Rowan

[11] 4,064,987
[45] Dec. 27, 1977

[54] CONVEYOR SYSTEM FOR HANDLING NON-RIGID CONTAINERS

[76] Inventor: Daniel J. Rowan, 26 Strawberry Hill Ave., Stamford, Conn. 06902

[21] Appl. No.: 657,613

[22] Filed: Feb. 12, 1976

[51] Int. Cl.$^2$ .............................................. B41J 33/44
[52] U.S. Cl. ..................................... 198/604; 53/246; 198/628; 198/811
[58] Field of Search ............... 198/165, 160, 280, 162, 198/163, 164, 22, 22 B, 854, 604, 605, 606, 198, 203, 34, 628, 627, 809, 811, 456, 436, 434; 308/238; 74/245 C, 245 P, 245 S, 250 C, 256, 251 R, 251 S, 251 C, 245, 250; 53/246

[56] References Cited

U.S. PATENT DOCUMENTS

| | | | |
|---|---|---|---|
| 2,140,595 | 12/1938 | Rapley | 198/165 |
| 2,508,216 | 5/1950 | Bonds et al. | 198/628 X |
| 2,577,086 | 12/1951 | Magnuson | 198/604 X |
| 2,598,190 | 5/1952 | Offutt | 198/627 X |
| 2,816,453 | 12/1957 | Frank et al. | 198/854 X |
| 2,858,007 | 10/1958 | McCain et al. | 198/165 X |
| 2,932,380 | 4/1960 | Alvey et al. | 198/160 UX |
| 2,965,215 | 12/1960 | Molins | 198/165 X |
| 3,108,682 | 10/1963 | Zipper | 198/162 |
| 3,762,534 | 10/1973 | Beresinsky | 198/165 |
| 3,854,688 | 12/1974 | Shuford | 198/860 X |

FOREIGN PATENT DOCUMENTS 248,019   2/1926   United Kingdom ............... 198/203

Primary Examiner—Evon C. Blunk
Assistant Examiner—Douglas D. Watts
Attorney, Agent, or Firm—Francis N. Carten

[57] ABSTRACT

A conveyor system for handling containers, particularly non-rigid bottles or jars, wherein the containers are gripped firmly but resiliently, to minimize deformation, and are conveyed, without friction or danger of marring, to a delivery zone where they can be delivered individually or in groups. The container gripping means includes holding jaws carried by complementary endless belts or chains, and inflatable pressure adjusting air bags for urging the holding jaws into engagement with the containers, holding them precisely spaced for subsequent operations and releasing them accurately on signal.

18 Claims, 16 Drawing Figures

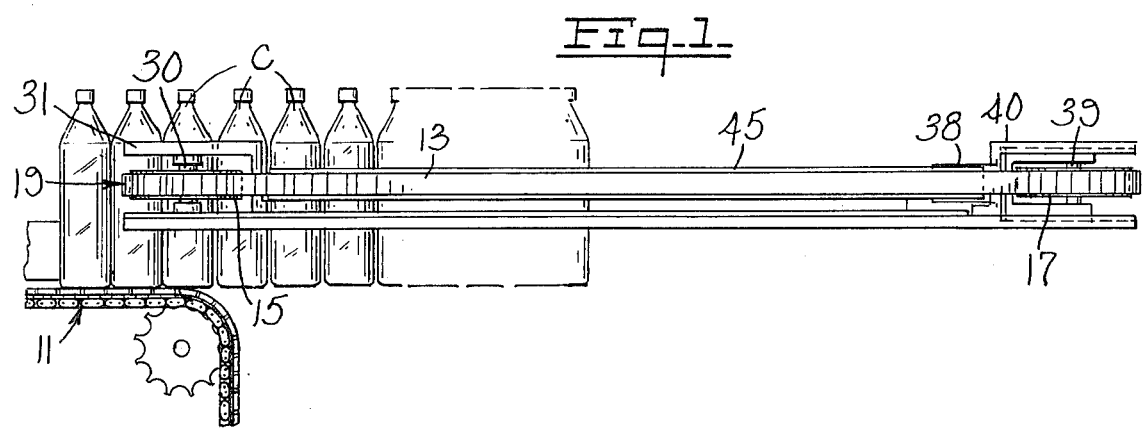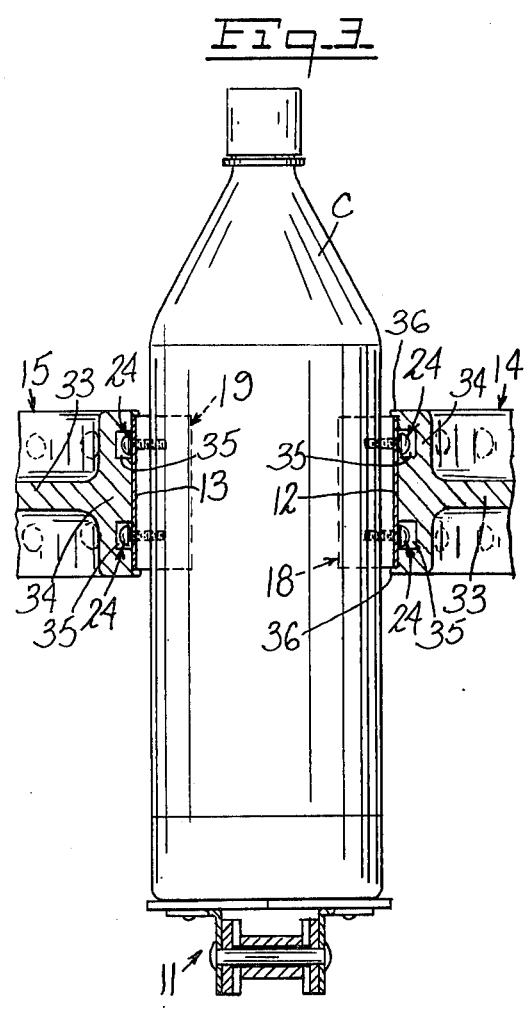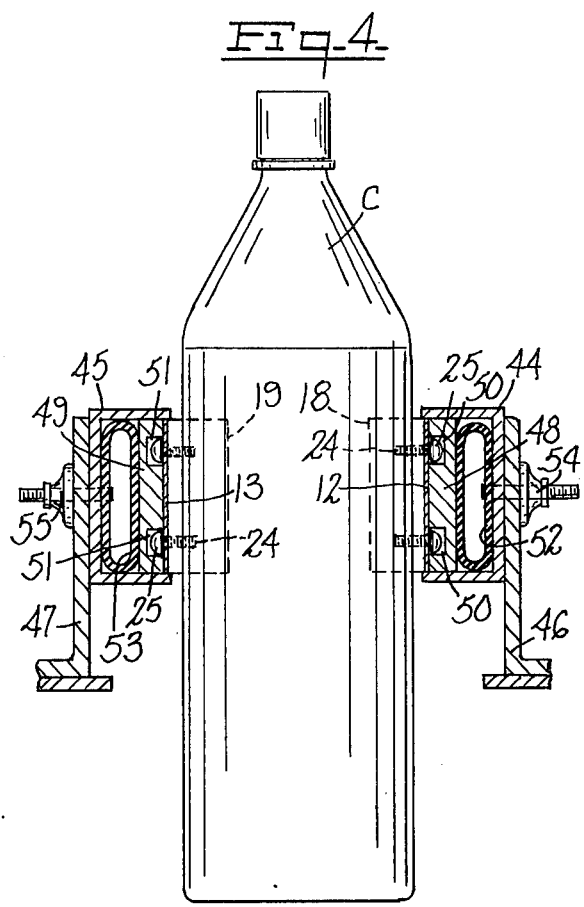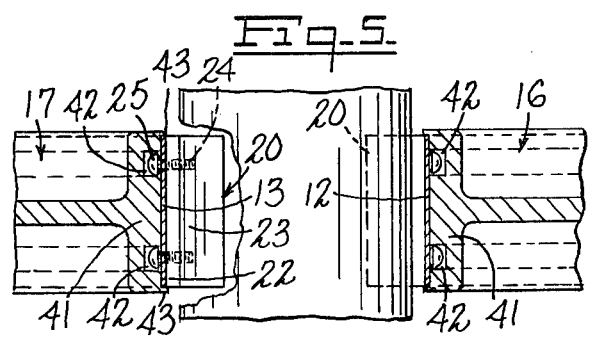

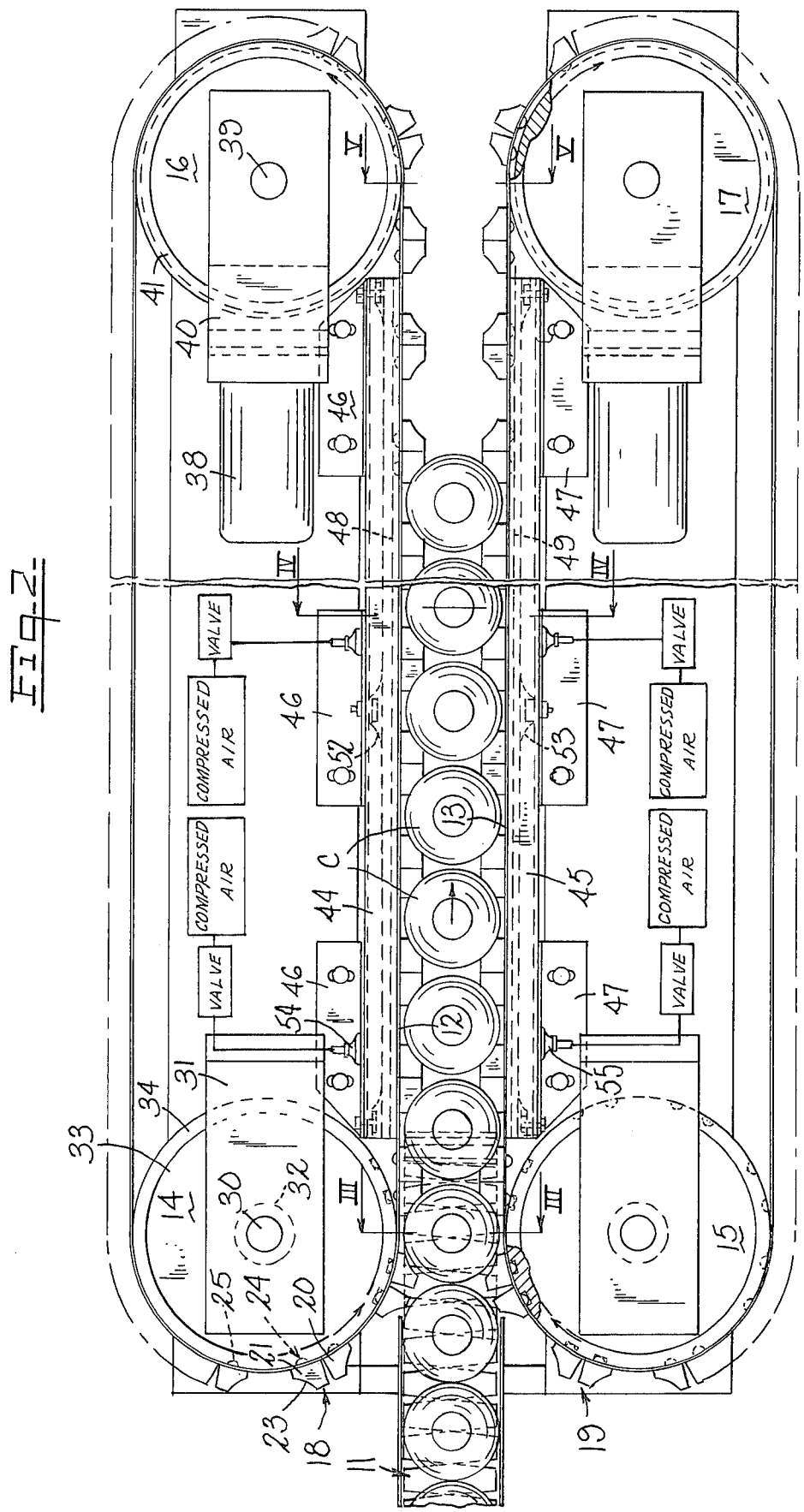

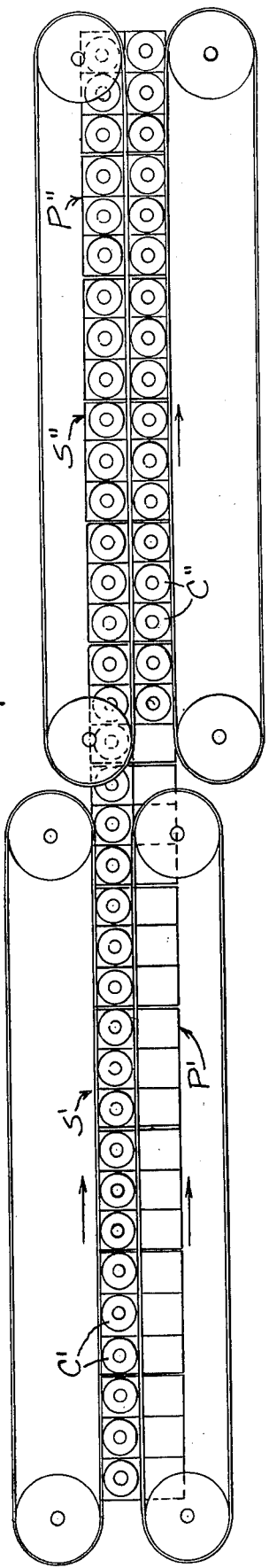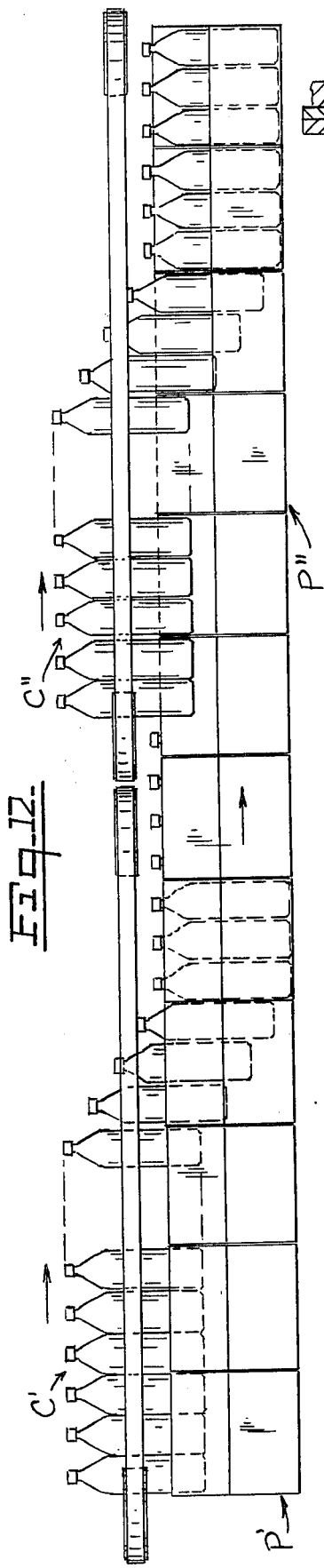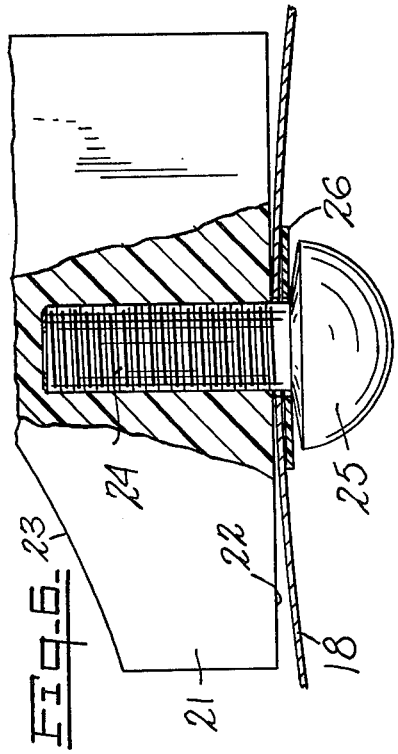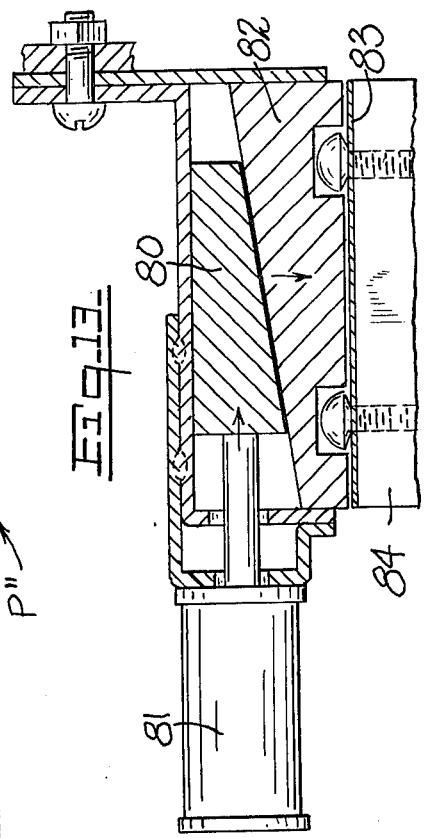

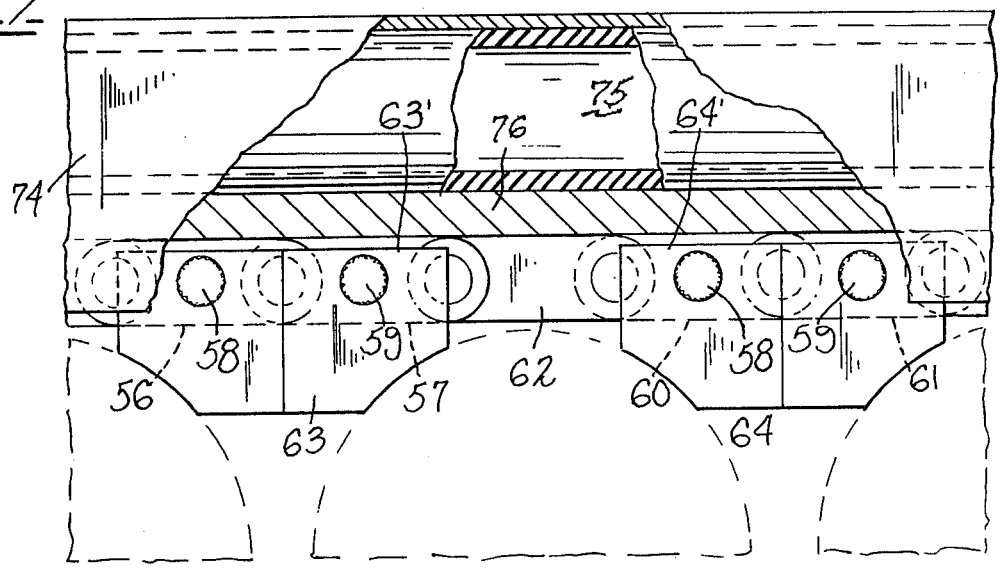
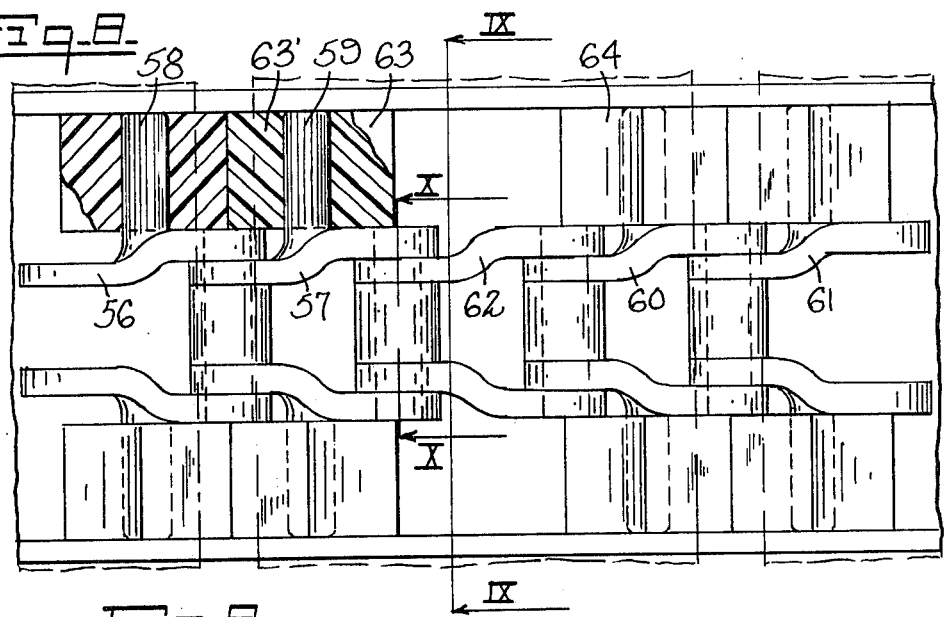
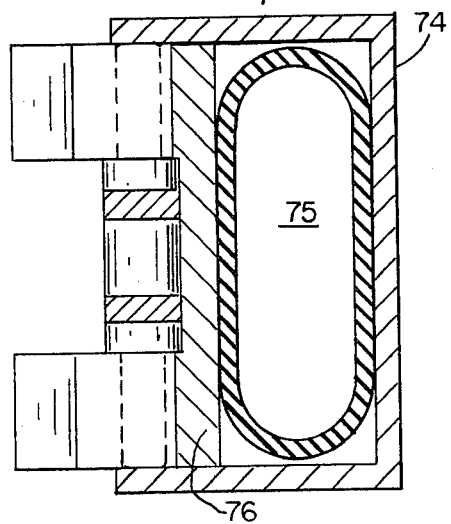
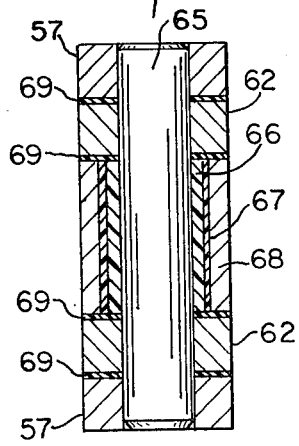

CONVEYOR SYSTEM FOR HANDLING NON-RIGID CONTAINERS

This invention relates to a conveyor system for handling containers, such as non-rigid plastic bottles or jars, characterized by the provision of belt-carried holding jaws which are preferably non-metallic and are urged into engagement with the containers by means of air bags acting through stationary self-lubricating wear resistant UHMW polyethylene shoes against the stainless steel belts in certain zones.

In the manufacture and subsequent filling, closing, labeling and coding of rigid containers, such as glass bottles, care must be taken not to break the bottles but the problems of marring and deformation do not arise. Non-rigid containers (i.e., thin-walled plastic bottles), however, can easily be scratched by sharp metal parts and can be so deformed by pressure as to cause serious variations in their capacity. Spring actuated holding means for glass bottles are known, and very flexible plastic bottles have been handled by an apparatus which includes neck gripping means, but such expedients do not solve the problem of handling normal plastic bottles and the like. For example, timing screws engage hard and relatively heavy glass bottles in a gradual spiral groove, the wall of which rubs against the entrapped bottle while moving it on a flat top chain conveyor and against a guide rail for spacing and timing purposes.

It is accordingly an object of the invention to provide a bottle conveyor system which includes belt-carried holding jaws and pneumatic means for urging said jaws into firmly gripping engagement with each bottle being conveyed; each light weight top heavy plastic bottle is held approximately at its long axis center of gravity.

It is another object of the invention to provide means for synchronizing the movement of complementary belts, for accurate positioning of the holding jaws carried thereby.

It is a further object of the invention to provide non-metallic holding jaws and special means for mounting them on the belts.

It is yet another object of the invention to provide a machine wherein the bottles being conveyed are case packed by a continuous drop-out system, or by providing an intermittently acting power source, it is possible to incorporate a dwell time for delivery of parts to a cylindrical apparatus as for filling the containers with various foods or other materials.

It is a still further object of the invention to provide certain improvements in the form, construction and arrangement of the several parts whereby the above named and other objects may effectively be attained.

The invention accordingly comprises the features of construction, combination of elements, and arrangement of parts which will be exemplified in the construction hereinafter set forth, and the scope of the invention will be indicated in the claims.

The apparatus comprises a pair of endless belts carried by synchronously driven rollers, each belt being provided with a series of arcuately faced holding jaws, the working runs of the belts being along parallel paths spaced to permit the respective jaws to engage the bottles to be filled or otherwise processed. The belts are backed by stationary wear sections or shoes of UHMW polyethylene and, in turn, by one or more elongated air bags or tubes, inflated to such degrees that the jaws are held resiliently against the sides of the bottles. Bottles, acting as their own spacers, are moved from a synchronized moving over-under flat conveyor and fed into holding jaws that enter the voids between containers, holding the containers in a four point suspension system firmly and without bottom support as the containers enter the adjustable pressure area. At this point the feed conveyor drops away and the bottles may be delivered successively to other machines or, after filling, by gravity into cartons or packs, i.e., by relieving the air pressure against the endless belts and permitting the filled bottles to drop into synchronously advancing cartons or packs.

A practical embodiment of the invention is shown in the accompanying drawings wherein:

FIG. 1 represents an elevation of the conveyor line, showing a portion of the feed belt;

FIG. 2 represents a plan view of the conveyor line, parts being broken away;

FIG. 3 represents a detail vertical section on the line III—III of FIG. 2, parts being broken away;

FIG. 4 represents a detail vertical section similar to FIG. 3 but on the line IV—IV of FIG. 2, parts being broken away;

FIG. 5 represents a detail vertical section on the line V—V of FIG. 2, parts being broken away;

FIG. 6 represents an enlarged partly sectional view of the jaw element attaching means;

FIG. 7 represents a detail plan view of one side of a modified form of conveyor, using a chain instead of a belt, parts being broken away;

FIG. 8 represents an elevation of the structure shown in FIG. 7, parts being broken away;

FIG. 9 represents a transverse vertical section on the line IX—IX of FIG. 8;

FIG. 10 represents a transverse vertical section on the line X—X of FIG. 8;

FIG. 11 represents a diagrammatic plan view of the layout of two conveyor systems assembled to handle two rows of containers, in offset relation, in order to deliver the containers to cartons or packs in parallel side-by-side rows, as in the so-called "six-pack";

FIG. 12 represents a diagrammatic elevational view of the systems shown in FIG. 11;

FIG. 13 represents a detail section corresponding to the right hand side of FIG. 4 and showing a wedge arrangement substituted for the air bag of FIG. 4;

Figure 14:
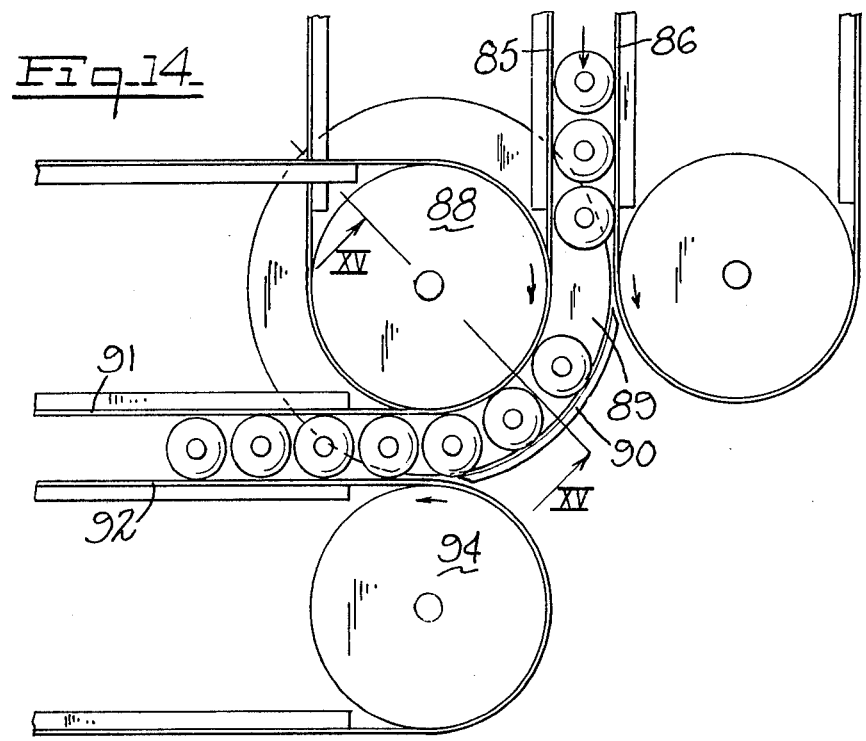
FIG. 14 represents a detail diagrammatic plan view of conveyor elements arranged to carry containers along a path having a right-angle turn.

Referring to the drawings, supporting elements such as the frame base, and driving elements such as motors and shafts (other than certain axles) are omitted for simplicity in illustration, such parts being conventional.

As shown in FIGS. 1 and 2 the containers C are supplied initially from any suitable source, by means of the flat top chain conveyor or feed belt 11, adapted to present the bottles in a single line with proper spacing to the upstream end of the conveyor system. The conveyor system comprises complementary endless belts 12, 13, each carried by rollers 14, 15 and 16, 17 and each provided with holding jaws designated generally as 18, 19. Since the belts and their associated parts are "mirror images" of each other only the belt 12 on rollers 14, 16, with jaws 18, will be described in structural detail, it being understood that the same description will apply to the other belt and its associated parts.

The belt 12 may suitably be a flat stainless steel band having a thickness on the order of 0.010 inch, and two inches wide, with pairs of vertically aligned holes punched at precisely determined intervals for attachment of the holding jaws 18. Each holding jaw comprises a pair of plastic blocks 20, 21 having flat bases 22 and arcuate surfaces 23, curved to conform with the side wall of the bottle to be carried. Each block is secured to the belt by a pair of screws 24, as shown in detail in FIG. 6, the screws being formed with a relief angle (e.g., of 9°) on the under-side of the head 25 and a nylon washer 26 being placed between the screw head and the belt surface. The blocks 20, 21 are preferably of a moldable or extrusion type plastic material having the characteristics of nylon; their flat bases 22 are drilled with plain holes to receive the screws 24 which are self-threading and are retained securely in place by the elasticity of the block material interfacing the threads of the screw that is bottomed-out to absorb vibrations and shock upon the deflections of the material against this interface. The relief angle enables the screws to remain firmly engaged with the washer and belt when the belt travels around a roller.

The rollers 14 and 15 are drive rollers, the axle 30 of the roller 14 being journaled in a support 31 and arranged to be driven by a motor, not shown, such as a hydraulic motor (for slow and steady starts), in synchronism with the axle of the roller 15. The roller 14 has a hub 32, a web portion 33 and a rim 34, the rim having a cylindrical outer surface and being provided with pairs of vertically spaced radial recesses 35 in the cylindrical surface and so spaced around the periphery thereof as to register with the screw heads 25 projecting from the inner surface of the belt. Preferably, the arcuate distance between the pairs of screws in each two-part holding jaw is an even multiple of the distance between the screws of adjacent jaws, so that a roller having recesses 35 spaced arcuately by said latter distance will have recesses in register with every screw head as the belt passes around the roller. The screw heads and recesses are so proportioned that the engagement thereof controls accurately the circumferential position of the belt on the roller, permitting no slippage, and the rim is provided with annular flanges 36 to aid in preventing displacement of the belt in an axial direction.

The rollers 16 and 17 may suitably be idler rollers, the axle 39 of roller 16 being supported on a part 40 of the machine frame, which may suitably be adjustable, as by means of a leak-proof air cylinder 38, to insure proper tensioning of the belt, with adjustable thrust for different belt sizes. The rim 41 of the roller 16 has a cylindrical outer surface, provided with annular grooves 42 spaced to receive freely the heads 25 of the upper and lower screws, as shown in FIG. 5. Flanges 43 insure accurate tracking of the belt.

Between the pairs of rollers 14, 15 and 16, 17 are mounted horizontal, laterally open, guide tracks 44, 45 fixedly supported on the machine frame by brackets 46, 47 (FIG. 4) and extending from points as close as possible to the downstream sides of the rollers 14, 15, to points as close as possible to the upstream sides of rollers 16, 17. The facing open sides of the tracks 44, 45 are occupied by elongated shoes 48, 49 (FIG. 4) presenting flat smooth, self-lubricating plastic faces to the adjacent belts 12, 13, the faces being longitudinally grooved at 50, 51 to receive freely the screw heads 25. Each shoe is backed by a plurality of elongated air bags 52, 53 connected by fittings 54, 55 to a source of compressed air, through suitable valve mechanism, not shown, and each shoe is divided in sections corresponding to the number of air bags. The air bags, tracks and shoes are preferably so located and proportioned that the shoes will lie at all times within the profiles of the tracks, leaving some room for the belts also to run between the upper and lower corners of the tracks, for additional security.

In the modified form of conveyor shown in FIGS. 7 to 10 the flat stainless steel belt is replaced by a jointed roller chain, selected adjacent links of which are provided with upwardly and downwardly projecting knurled stubs, each pair of such stub-carrying links being separated by a single plain link. Thus in FIGS. 7 and 8 the adjacent links 56, 57 with stubs 58, 59 are separated from links 60, 61, having stubs, by the plain link 62. The plastic holding jaw blocks 63, 64 are like the blocks 20, 21 but include base portions 63', 64' which are bored to have a force fit on the respective stubs.

As compared to conventional rollers that are made of metal or plastic, the roller herein is provided with a self-lubricating material, one such structure being shown in FIG. 10 where the roller 65 passes through a cylindrical sleeve 66 of an ultra-high molecular weight polymer such as that sold under the trademark GARDUR by Garland Manufacturing Co. of Saco, Maine, the sleeve 66 being backed by a nylon sleeve 67 within the steel ferrule 68 and the roller being engaged, as shown, with the links 62 and 57, nylon washers 69 being interposed between each of the adjacent metal parts. A slight clearance must be provided adjacent the nylon sleeve 67, to allow for the expansion of the nylon in use. A roller chain as just described may function satisfactorily without added lubrication due to the anti-friction characteristics of the materials used. Tracks 74 with air bags 75 and shoes 76 (FIG. 9) are the same as the corresponding elements in FIGS. 1 and 2. With the chain belt, the drive rollers are modified to a suitable sprocket form, for accurate synchronization. The term "belt" is used herein generically, unless otherwise indicated, to include both the endless stainless steel belt of FIGS. 1 to 5 and the endless chain belt of FIGS. 7 to 10.

In operation, containers such as light weight plastic bottles are supplied to the machine by the flat top chain feed belt 11 (FIGS. 1 and 2), preferably single file and necessarily one by one. The feed belt's speed is synchronized with the speed of the conveyor and a conventional gate device, not shown, permits each container to enter the system and mesh properly with the first pairs of holding jaws 18, 19, the height of the jaws being such that the container is held at and above its filled center of gravity. The holding jaws are proportioned to keep the containers slightly separated because the conveyor can be used to handle bottles freshly delivered from a blow molding machine and still somewhat warm. As soon as the containers are held firmly by the holding jaws the feed belt drops away, as shown at the left of FIG. 1, and the containers are carried thereafter by means of the frictional engagement of the jaws. The length of the conveyor can be extended to a degree sufficient for the performance of various operations including filling, bottom coding and labeling, capping, and labeling by conventional means, not shown, and the last step may be the delivery of containers, singly or in groups, into cartons or packs.

FIGS. 11 and 12 show how two such conveyor systems S' and S" may be arranged in offset alignment to move two rows of containers C' and C" past operative stations (e.g., filling, capping, etc.), not shown, and to deliver them by gravity in groups of three to a row of empty "six-pack" holders P, moved synchronously into position to receive the containers. The conveyors are caused to release the filled containers by reducing the pressure in the air bags at the latter portion of each container run, so that the holding jaws gradually let go of the containers.

As indicated in FIG. 12, a group of three containers has been delivered to one side of the holder P' by the system S', the containers advancing in a straight line to a position P" where another group of three containers is delivered by the system S" to the other side of the holder, completing the "six-pack".

The containers could, if desired, be supplied empty to the cartons or packs and filled and capped thereafter.

FIG. 13 shows a detail modification wherein the air bag is replaced by a series of wedges 80 (one being shown) actuated by hydraulic, pneumatic or solenoid means 81 to exert pressure on the beveled rear surface of a grooved shoe 82, corresponding to shoes 48, 49, which, in turn, bears against the belt 83 with holding jaws 84, as previously described.

Figure 15:
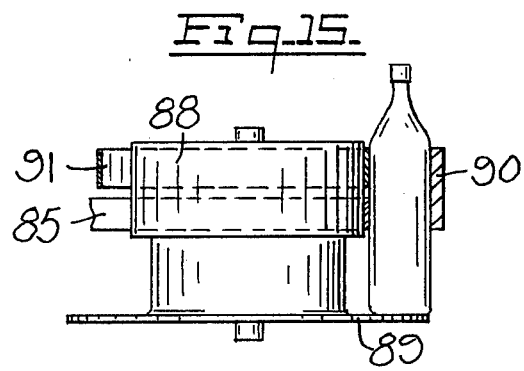
FIG. 15 represents a vertical section on the line XV—XV of FIG. 14.
Figure 16:
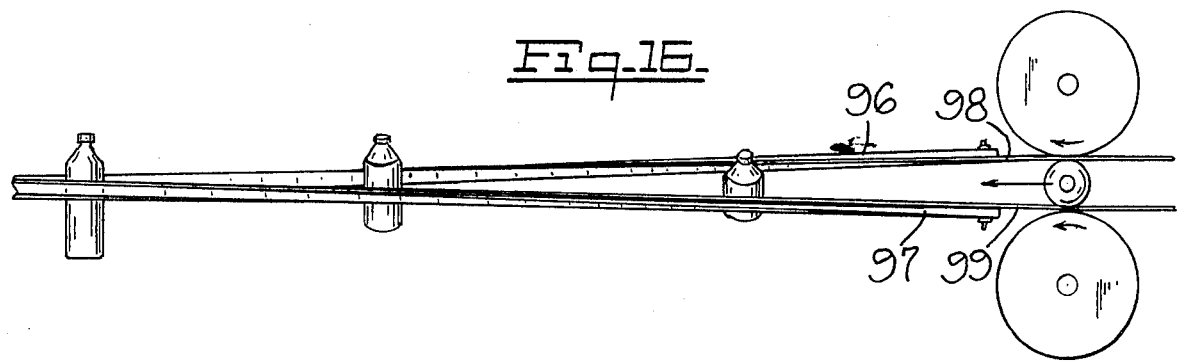
FIG. 16 represents diagrammatically an arrangement of conveyor elements adapted to invert the containers.

In addition to the straight line conveyor setups disclosed above, the conveyor elements can be associated with additional container handling devices including those shown in FIGS. 14 to 16.

FIGS. 14 and 15 show the delivery end of a pair of belts 85, 86 which may correspond to those shown in FIG. 2. In this case, however, the containers are conveyed around a 90° turn to the right by means of the roller 88 which is equipped with a flat annular apron 89 having a width sufficient to receive and support the container when it is released by the holding blocks (not shown) on the belts. A curved guide 90 retains the containers on the apron as they pass around the roller 88, still more or less in contact with holding blocks on the belt 85. After completing the 90° turn, the containers are gripped by the holding blocks on a second pair of belts 91, 92, on the rollers 88, 94 for conveyance to a delivery point or further processing device. The belts 91, 92 are at a higher level than the belts 85, 86 to permit the belt 91 to pass around the upper portion of the roller 88 where its holding blocks are synchronized with those on the belt 85.

Straight line inverting of the containers can be effected by means of the spiral track arrangement shown diagrammatically in FIG. 16. A pair of tracks 96, 97, similar to tracks 44, 45, and each provided along its length with air bags and pressure shoes, are twisted in such a manner that the space between them remains substantially constant. Belts 98, 99 with holding blocks as described above (not shown in this figure) are moved along the faces of the pressure shoes and containers are carried by the blocks in positions which progress from vertical right side up to vertical inverted. The shoes are of a material which is adapted to function in the required manner, whether they are straight as previously described or in the form of a twisted ribbon, as in FIG. 16.

The holding jaws of a nylon-like material are generally non-marring but could, if desired, be faced with a softer plastic material. The soft light weight plastic bottles or the like can be firmly held in the four-point grip of the holding jaws without bottom support, in contrast to machines wherein the containers are forced to slide along a supporting surface, causing frictional marring of the bottoms and sides.

The conveyor system can be arranged to include means for performing various operations or may be used only to convey containers to or between such machines as A washing and rinsing machine.

An inverter that picks up light plastic bottles, swings them through 180° and delivers them to another conveyor system going in the same or a different direction.

A filling machine.

A capping machine that places caps on bottle necks, spins them down and tightens them correctly.

A bottom coder and/or labeling machine.

A case packer for placing filled plastic bottles in cases or packs in a continuous operation.

It may thus be seen that the objects of the invention set forth as well as those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A conveyor system for handling containers, comprising a pair of endless belts carried by rollers and arranged to have straight parallel conveying runs, said belts being spaced by a distance commensurate with the diameter of the containers to be conveyed, each belt being provided on its outer surface with a pair of spaced holding jaws for each container, means for synchronously driving said belts, and means including at least one air bag and a source of air under pressure for applying a plurality of adjustable pressures to at least one belt over a plurality of portions of its conveying run to urge said at least one belt toward the other belt in corresponding portions of its conveying run to hold each container without bottom support by applying different pressures to the containers through said holding jaws in each of said plurality of portions of the conveying run of said at least one belt.

2. A conveyor system according to claim 1 which includes means for applying adjustable pressure to both belts over at least a portion of the conveying run of each belt, biasing said belts toward each other.

3. A conveyor system according to claim 2 wherein said means for applying adjustable pressure includes at least one air bag adjacent each belt and means for supplying air under pressure thereto.

4. A conveyor system according to claim 1 which includes a movable shoe interposed between said at least one air bag and the adjacent endless belt.

5. A conveyor system according to claim 1 wherein each holding jaw is provided with a holding face portion complementary to the side wall of the container to be held.

6. A conveyor system according to claim 5 wherein said holding face portions are of relatively soft non-marring material.

7. A conveyor system according to claim 1 wherein at least one roller for each belt is a drive roller, each belt is flat stainless steel and each holding jaw is attached to its supporting belt by screws, the heads of said screws being adapted to engage recesses in the respective drive rollers.

8. A conveyor system according to claim 7 wherein said screws are formed with beveled under-cut heads to facilitate flexing of the belts.

9. A conveyor system according to claim 1 wherein said belts are jointed roller chains, selected links of which are provided with upwardly and downwardly projecting knurled stubs which are force-fitted into bores in said holding jaws.

10. A conveyor system according to claim 9 wherein each of said roller chains comprises links engaged by rollers, each roller being journaled in a cylindrical sleeve of a ultra-high molecular weight polymer.

11. A conveyor system according to claim 10 wherein said cylindrical sleeve is backed by a nylon sleeve and fitted within a steel ferrule.

12. A conveyor system according to claim 11 wherein said sleeves and ferrule are fitted on the middle portion of the roller, the ends of the roller being engaged with the adjacent links.

13. A conveyor system according to claim 1 combined with a second conveyor system for conveying containers in a different direction, said second conveyor system comprising a second pair of endless belts carried by rollers, one of said last-named rollers being common to both conveyor systems and being provided with a horizontally extending apron for supporting a container, with an arcuate guide adjacent said apron for guiding a container from said first pair of belts to said second pair of belts.

14. A conveyor system according to claim 1 wherein the straight parallel conveying runs are spirally twisted to vary the orientation of the containers.

15. A conveyor according to claim 14 wherein the orientation of the containers is varied to the point of inverting said containers.

16. A conveyor system according to claim 1, wherein said means for applying adjustable pressures includes at least one grooved shoe and means for camming said at least one grooved shoe against said at least one belt.

17. A conveyor system according to claim 16, wherein said camming means includes at least one wedge bearing against an angled rear surface of said at least one grooved shoe in a confined space, and means operative when actuated to move said at least one wedge with respect to said angled rear surface of said at least one grooved shoe in said confined space.

18. A conveyor system according to claim 1 combined with a second conveyor system for conveying containers in the same direction, the conveying runs of said conveyor system being parallel and offset from one another.

* * * * *